United States Patent
Kusama et al.

(10) Patent No.: US 8,568,873 B2
(45) Date of Patent: Oct. 29, 2013

(54) PRESSURE-SENSITIVE ADHESIVE FOR POLARIZING PLATES, POLARIZING PLATE WITH PRESSURE-SENSITIVE ADHESIVE AND PRODUCTION PROCESS FOR THE SAME

(75) Inventors: Kentaro Kusama, Saitama (JP); Koichi Nagamoto, Saitama (JP); Mikihiro Kashio, Saitama (JP); Kazuhiro Kon, Saitama (JP); Motoyuki Hayakawa, Tokyo (JP)

(73) Assignee: Lintec Corporation, Tokyo (JP)

( * ) Notice: Subject to any disclaimer, the term of this patent is extended or adjusted under 35 U.S.C. 154(b) by 1024 days.

(21) Appl. No.: 11/608,024

(22) Filed: Dec. 7, 2006

(65) Prior Publication Data

US 2007/0148485 A1 Jun. 28, 2007

(30) Foreign Application Priority Data

Dec. 26, 2005 (JP) ................................ 2005-373147
Jul. 26, 2006 (JP) ................................ 2006-203582

(51) Int. Cl.
| | |
|---|---|
| B32B 27/30 | (2006.01) |
| B32B 37/12 | (2006.01) |
| B32B 37/14 | (2006.01) |
| B32B 38/18 | (2006.01) |
| C08F 2/46 | (2006.01) |
| C09J 133/08 | (2006.01) |
| C09J 133/26 | (2006.01) |
| G02F 1/1335 | (2006.01) |

(52) U.S. Cl.
USPC .......... 428/345; 428/40.1; 428/41.8; 428/343; 428/355 R; 428/355 EN; 428/355 AC; 428/355 CN; 156/272.2; 156/273.3; 156/275.5; 156/332; 522/1; 522/121; 522/151; 522/153; 522/154; 522/904

(58) Field of Classification Search
None
See application file for complete search history.

(56) References Cited

U.S. PATENT DOCUMENTS 5,232,958 A * 8/1993 Mallya et al. ................ 522/107
5,506,051 A * 4/1996 Levy-Borochov et al. ... 428/332
(Continued)

FOREIGN PATENT DOCUMENTS

EP 349645 A1 * 1/1990
JP 59111114 A * 6/1984
(Continued)

OTHER PUBLICATIONS

Machine Translation of JP 2001107005 A, Apr. 2001.*
(Continued)

*Primary Examiner* — David Sample
*Assistant Examiner* — Jeff Vonch
(74) *Attorney, Agent, or Firm* — Oblon, Spivak, McClelland, Maier & Neustadt, L.L.P.

(57) ABSTRACT

Provided are a pressure-sensitive adhesive for polarizing plates which can apply a polarizing plate on a liquid crystal cell with good adhesion and has the characteristic that a liquid crystal display device obtained therefrom is less liable to cause light leakage even under the environment of high temperature and high humidity and which has a removability and a polarizing plate with the above pressure-sensitive adhesive and a production process for the same. The pressure-sensitive adhesive for polarizing plates is prepared by irradiating a pressure-sensitive adhesive material comprising (A) an acrylic base polymer comprising a monomer having a carboxyl group in a monomer composition ratio of 0.5 mass % or less and (B) an active energy beam-curable compound with an active energy beam and it has a storage elastic modulus (G') of 0.3 MPa or more at 23° C.

15 Claims, 2 Drawing Sheets

(56) References Cited

U.S. PATENT DOCUMENTS

| | | | |
|---|---|---|---|
| 5,559,201 A * | 9/1996 | Sorensen | 526/266 |
| 5,905,099 A * | 5/1999 | Everaerts et al. | 522/126 |
| 5,942,578 A * | 8/1999 | Noguchi et al. | 525/228 |
| 6,013,722 A * | 1/2000 | Yang et al. | 524/558 |
| 6,376,571 B1 * | 4/2002 | Chawla et al. | 522/64 |
| 6,472,065 B1 * | 10/2002 | Alahapperuma et al. | 428/343 |
| 6,478,918 B2 * | 11/2002 | Bennett et al. | 156/248 |
| 6,800,366 B2 * | 10/2004 | Chang et al. | 428/355 AC |
| 7,358,289 B2 | 4/2008 | Toriumi et al. | |
| 2002/0037413 A1 | 3/2002 | Kishioka et al. | |
| 2002/0054262 A1 * | 5/2002 | Kitagawa et al. | 349/122 |
| 2005/0014879 A1 * | 1/2005 | Moroishi et al. | 524/261 |
| 2005/0266239 A1 * | 12/2005 | Satake et al. | 428/354 |

FOREIGN PATENT DOCUMENTS

| | | | |
|---|---|---|---|
| JP | 2000109770 A * | 4/2000 | |
| JP | 2001-107005 | 4/2001 | |
| JP | 2001107005 A * | 4/2001 | |
| JP | 2001-214143 | 8/2001 | |
| JP | 2003114331 A * | 4/2003 | |
| KR | 10-2005-0061552 | 6/2005 | |
| TW | 200530319 A | 9/2005 | |

OTHER PUBLICATIONS

English Translation of JP 59111114 A, Jun. 1984.*
Machine Translation of JP 2000109770 A, Apr. 2000.*
Machine Translation of JP 2003114331 A, Apr. 2003.*
MSDS for 1,3-Dioxane-5,5-dimethanol, (no date).*
U.S. Appl. No. 11/611,947, filed Dec. 18, 2006, Nagamoto, et al.
Office Action issued Jan. 10, 2012 in Japan Application No. 2006-203582.
Office Action issued Aug. 6, 2012 in Taiwanese Patent Application No. 095148684.
Office Action issued Nov. 19, 2012 in Korean Application No. 10-2006-0132824.

* cited by examiner

PRESSURE-SENSITIVE ADHESIVE FOR POLARIZING PLATES, POLARIZING PLATE WITH PRESSURE-SENSITIVE ADHESIVE AND PRODUCTION PROCESS FOR THE SAME

BACKGROUND OF THE INVENTION

1. Field of the Invention

The present invention relates to a pressure-sensitive adhesive for polarizing plates, a polarizing plate with the pressure-sensitive adhesive and a production process for the same, and an optical film using the above polarizing plate with the pressure-sensitive adhesive and a production process for the same. More specifically, the present invention relates to a pressure-sensitive adhesive for polarizing plates which is suitably applied to a polarizing plate, particularly a polarizing plate integrated with a viewing angle expanding film or a polarizing plate comprising a retardation film laminated thereon and can apply the above polarizing plate on a liquid crystal cell with good adhesion and which has the characteristic that a liquid crystal display obtained therefrom is less liable to cause light leakage even under the environment of high temperature and high humidity and can readily be peeled off when applied mistakenly, a polarizing plate with the above pressure-sensitive adhesive and a production process for the same and an optical film and a production process for the same.

2. Description of the Related Art

When a sheet comprising organic materials is applied on an adherend such as glass, ceramic and metal via a pressure-sensitive adhesive, the unfavorable situation that peeling of the sheet in an end part or lifting thereof is caused with the passage of time has so far frequently been brought about.

In order to solve the above situation, usually used is a strongly pressure-sensitive adhesive material in which an adhesive performance is enhanced by raising a molecular weight of a component constituting a pressure-sensitive adhesive or elevating a cross-linking density thereof. However, while the holding power is improved when using the above strongly pressure-sensitive adhesive material, the pressure-sensitive adhesive can not follow a change in the shape which is caused by shrinkage or swelling of the sheet comprising organic materials under the environment of high temperature and high humidity, and it is a factor to bring about various troubles.

On the other hand, those in which a polarizing plate is applied on a surface thereof are included in optical parts, and a representative example thereof includes a liquid crystal cell of a liquid crystal display (LCD). It shall be explained below with reference to FIG. 1.

This liquid crystal cell 13 has usually a structure in which two transparent electrode substrates having orientation layers formed thereon are disposed with the orientation layers turned to an inside so that a prescribed interval is formed by spacers and the periphery thereof is sealed to interpose a liquid crystal material in the above interval and in which polarizing plates 11 are disposed respectively on the two transparent electrode substrates described above via pressure-sensitive adhesives 12. In general, the polarizing plate described above comprises a polarizing film having a three layer structure in which optically isotropic films, for example, triacetyl cellulose (TAC) films are adhered on both surfaces of a polyvinyl alcohol base polarizer, and a pressure-sensitive adhesive layer is further provided on the other surface thereof for the purpose of applying on an optical part such as a liquid crystal cell.

Further, as shown in a schematic drawing of FIG. 2, a retardation film 24 is disposed in a certain case between a polarizing plate 21 and a liquid crystal cell 23 via pressure-sensitive adhesives 22 and 25 in order to improve the viewing angle characteristics.

When applying a polarizing plate having the constitution described above to an optical part such as a liquid crystal cell or applying a polarizing plate to a retardation film, it results in assuming a multilayer structure comprising different kinds of the materials and is short of a dimensional stability, and a change in the dimension caused by shrinkage and swelling is increased particularly under the environment of high temperature and high humidity. In general, the strongly pressure-sensitive adhesive described above is used as a pressure-sensitive adhesive for the above polarizing plate, and therefore lifting and peeling brought about by a change in a dimension of the polarizing plate can be inhibited. However, a stress brought about by a change in a dimension of the above polarizing plate can not be absorbed by the pressure-sensitive adhesive layer to make a residual stress in the polarizing plate uneven. As a result thereof, brought about are the problems that liable to be produced are so-called "light leakage" in a TN liquid crystal cell and "uneven color" in STN liquid crystal.

In order to solve the problems described above, disclosed is a technique in which a pressure-sensitive adhesive is suitably softened and provided with a stress relaxing property by adding a low molecular weight substance such as a plasticizer to a pressure-sensitive adhesive (refer to, for example, a patent document 1). However, addition of the low molecular weight substance causes stain of the adherend when peeling off the polarizing plate and, in addition thereto, lowers the holding power, and lifting and peeling brought about by the passage of time are liable to be caused.

On the other hand, disclosed is a pressure-sensitive adhesive sheet obtained by radiation-induced cross-linking a mixture comprising an acrylic base copolymer (A) and an acrylic base polymer (B) having a radiation-polymerizable group in a side chain in a proportion of 100:1 to 100:100 in terms of a weight ratio (refer to, for example, a patent document 2).

In the above patent document, examples are described for polarizing plates, but a size of samples evaluated for a light leaking property is not described in any of the examples. The present inventors evaluated a light leaking property of a polarizing plate having a 15 inch size using the pressure-sensitive adhesives described in the examples of the above patent document, and the results thereof were not sufficiently satisfactory.

As described above, it is difficult to allow an adhesion durability to be consistent with a light leakage preventing property in a pressure-sensitive adhesive for a polarizing plate, and it is a subject to allow them to stand together.

In a production step of a liquid crystal display and the like, when an applying position is deviated in applying a polarizing plate on an optical part such as a liquid crystal cell, the polarizing plate has to be peeled off in a certain case after some time passes since applied to reuse the expensive liquid crystal cell. Accordingly, required is such a pressure-sensitive adhesive that a polarizing plate can relatively readily be peeled off from a liquid crystal cell even after some time passes since applied on the liquid crystal cell via the pressure-sensitive adhesive coated on the polarizing plate. This is a property which is contradictory to strengthening of an adhesive strength for providing an adhesion durability, and it is a subject to allow them to stand together.

Patent document 1: Japanese Patent No. 3272921
Patent document 2: Japanese Patent Application Laid-Open No. 107005/2001

SUMMARY OF THE INVENTION

In light of the situation described above, an object of the present invention is to provide a pressure-sensitive adhesive for polarizing plates which is suitably applied to a polarizing plate, particularly a polarizing plate integrated with a viewing angle expanding film or a polarizing plate comprising a retardation film laminated thereon and can apply the above polarizing plate on a liquid crystal cell with good adhesion and which has the characteristic that a liquid crystal display device obtained therefrom is less liable to cause light leakage even under the environment of high temperature and high humidity and can readily be removed (hereinafter referred to merely as "remove") from the liquid crystal cell even after some time passes since applied and a polarizing plate with the above pressure-sensitive adhesive.

Intensive researches repeated by the present inventors in order to develop a pressure-sensitive adhesive for polarizing plates having the characteristics described above have resulted in finding that the above object can be achieved by a pressure-sensitive adhesive for polarizing plates which is obtained by irradiating a pressure-sensitive adhesive material comprising a specific acrylic base copolymer and an active energy beam-curable compound with an active energy beam.

Further, the present inventors have found that the polarizing plate with the pressure-sensitive adhesive described above can efficiently be produced by applying a polarizing plate on a pressure-sensitive adhesive material layer provided on a release layer of a release sheet and irradiating a release sheet side with an active energy beam.

The present invention has been completed based on the above knowledge.

That is, the present invention provides:

(1) a pressure-sensitive adhesive for polarizing plates, which is prepared by irradiating a pressure-sensitive adhesive material comprising (A) an acrylic base polymer comprising a monomer having a carboxyl group in a monomer composition ratio of 0.5 mass % or less and (B) an active energy beam-curable compound with an active energy beam and which has a storage elastic modulus (G') of 0.3 MPa or more at 23° C., (2) the pressure-sensitive adhesive for polarizing plates as described in the above item (1), wherein the storage elastic modulus (G') at 23° C. is 0.3 to 15 MPa, (3) the pressure-sensitive adhesive for polarizing plates as described in the above item (1) or (2), wherein the storage elastic modulus (G') at 80° C. is 0.3 MPa or more, (4) the pressure-sensitive adhesive for polarizing plates as described in the above item (3), wherein the storage elastic modulus (G') at 80° C. is 0.3 to 10 MPa, (5) the pressure-sensitive adhesive for polarizing plates as described in any of the above items (1) to (4), wherein it is used for applying a polarizing plate on a liquid crystal glass cell, (6) the pressure-sensitive adhesive for polarizing plates as described in any of the above items (1) to (5), wherein the active energy beam-curable compound of the component (B) is a multifunctional (meth)acrylate base monomer having a molecular weight of less than 1000, (7) the pressure-sensitive adhesive for polarizing plates as described in the above item (6), wherein the multifunctional (meth)acrylate base monomer has a cyclic structure, (8) the pressure-sensitive adhesive for polarizing plates as described in any of the above items (1) to (7), wherein a content proportion of the component (A) to the component (B) is 100:1 to 100:100 in terms of a mass ratio, (9) the pressure-sensitive adhesive for polarizing plates as described in any of the above items (1) to (8), wherein the pressure-sensitive adhesive material further comprises (C) a cross-linking agent,

(10) the pressure-sensitive adhesive for polarizing plates as described in any of the above items (1) to (9), wherein the pressure-sensitive adhesive material further comprises (D) a silane coupling agent,

(11) the pressure-sensitive adhesive for polarizing plates as described in any of the above items (1) to (10), wherein the adhesive strength to non-alkali glass is 0.2 to 20 N/25 mm,

(12) the pressure-sensitive adhesive for polarizing plates as described in the above item (11), wherein a rise percentage of the adhesive strength to non-alkali glass after 168 hours pass since applied is 20% or less based on the initial value,

(13) the pressure-sensitive adhesive for polarizing plates as described in any of the above items (1) to (12), wherein the maximum shear load at a distortion of 4000% or less in applying the polarizing plate on non-alkali glass at an applying area of 100 mm² (10 mm×10 mm) and measuring a shear load at a shearing rate of 0.1 mm/minute is 70 N or less,

(14) the pressure-sensitive adhesive for polarizing plates as described in any of the above items (1) to (13), wherein a gel ratio is 85% or more,

(15) a polarizing plate with a pressure-sensitive adhesive, characterized by having a layer comprising the pressure-sensitive adhesive as described in any of the above items (1) to (14) on a polarizing plate,

(16) a production process for the polarizing plate with the pressure-sensitive adhesive as described in the above item (15), comprising applying a polarizing plate on a pressure-sensitive adhesive material layer provided on a release layer of a release sheet and then irradiating a release sheet side with an active energy beam and

(17) a pressure-sensitive adhesive sheet prepared by interposing the pressure-sensitive adhesive for polarizing plates as described in any of the above items (1) to (14) between two release sheets so that the pressure-sensitive adhesive is brought into contact with release layer sides of the release sheets.

According to the present invention, capable of being provided are a pressure-sensitive adhesive for polarizing plates which is suitably applied to a polarizing plate, particularly a polarizing plate integrated with a viewing angle expanding film or a polarizing plate comprising a retardation film laminated thereon and can apply the above polarizing plate on a liquid crystal cell with good adhesion and which has the characteristic that a liquid crystal display obtained therefrom is less liable to cause light leakage even under the environment of high temperature and high humidity and can relatively readily be peeled off from a liquid crystal cell even after some time passes since applied and a polarizing plate with the above pressure-sensitive adhesive.

Further, according to the present invention, a process for efficiently producing the polarizing plate with the pressure-sensitive adhesive described above can be provided.

BRIEF DESCRIPTIONS OF THE DRAWINGS

Figure 1:
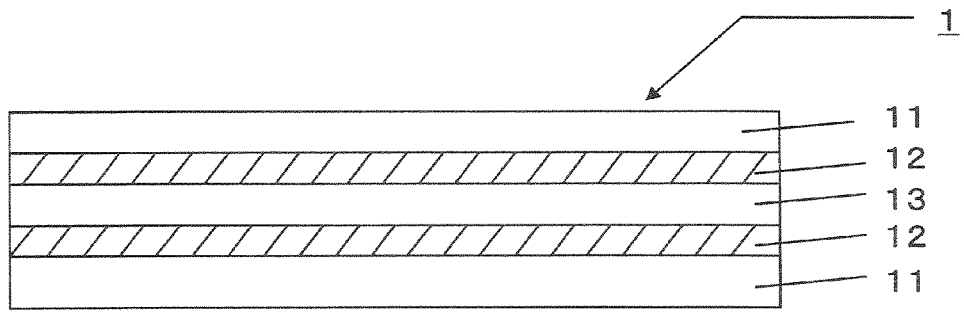
FIG. 1 is an outline drawing showing a constitution of LCD.

EXPLANATIONS OF THE CODES 1, 2: Liquid crystal displays
11, 21: Polarizing plates
12, 22, 25: Pressure-sensitive adhesives
13, 23: glass (liquid crystal cells)
24: Retardation film

DETAILED DESCRIPTION OF THE INVENTION

The pressure-sensitive adhesive of the present invention for polarizing plates is a pressure-sensitive adhesive for polarizing plates, which is prepared by irradiating a pressure-sensitive adhesive material comprising (A) an acrylic base polymer comprising a monomer having a carboxyl group in a monomer composition ratio of 0.5 mass % or less and (B) an active energy beam-curable compound with an active energy beam.

A (meth)acrylic ester polymer can be given as the acrylic base polymer of the component (A). In the present invention, (meth)acrylic ester means both acrylic ester and methacrylic ester. The same shall apply to other similar terms. The polymer means both a "homopolymer" and a "copolymer".

The component (A) in the present invention is characterized by comprising a monomer having a carboxyl group in a monomer composition ratio of 0.5 mass % or less. Usually, in order to provide a pressure-sensitive adhesive with a strong pressure-sensitive adhesive property, a monomer having a cross-linking point represented by a carboxyl group is copolymerized with a (meth)acrylic ester monomer having no cross-linking point to obtain a (meth)acrylic ester base copolymer, and this is used as a principal agent for a pressure-sensitive adhesive. In contrast with this, the acrylic base polymer (A) comprises a monomer having a carboxyl group in a monomer composition ratio of 0.5 mass % or less, and it is preferably a polymer of a (meth)acrylic ester monomer having no carboxyl group.

Controlling a content of the monomer having a carboxyl group to 0.5 mass % or less makes it possible to secure the removability which is the object of the present invention. The monomer having a carboxyl group includes (meth)acrylic acid, crotonic acid, maleic acid and itaconic acid.

A polymer of (meth)acrylic ester in which an alkyl group of an ester part has 1 to 20 carbon atoms can preferably be given as the (meth)acrylic ester polymer. In this regard, the examples of the (meth)acrylic ester in which an alkyl group of an ester part has 1 to 20 carbon atoms include methyl(meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl(meth)acrylate, dodecyl(meth)acrylate, myristyl(meth)acrylate, palmityl(meth)acrylate and stearyl(meth)acrylate. They may be used alone or in combination of two or more kinds thereof.

Among the above compounds, ethyl(meth)acrylate and butyl(meth)acrylate are particularly preferred in terms of readily controlling a molecular weight in producing the polymer.

The (meth)acrylic acid ester polymer described above may contain a copolymerizable component as a constitutional component as long as the effects of the present invention are not damaged. To be specific, it is a monomer having a hydroxyl group, an amino group and an amide group as a functional group, and the specific examples thereof include hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl(meth)acrylate; acrylamides such as acrylamide, methacrylamide, N-methylacrylamide, N-methylmethacrylamide, N-methylolacrylamide and N-methylolmethacrylamide; and (meth)acrylic acid monoalkylamino esters such as monomethylaminoethyl(meth)acrylate, monoethylaminoethyl(meth)acrylate, monomethylaminopropyl(meth)acrylate and monoethylaminopropyl(meth)acrylate. The above monomers may be used alone or in combination of two or more kinds thereof.

In the above pressure-sensitive adhesive material, the (meth)acrylic ester polymer used as the component (A) has preferably a molecular weight of 500,000 or more in terms of a weight average molecular weight. If the weight average molecular weight is 500,000 or more, the adhesion with an adherend and the adhesive durability under high temperature and high humidity are satisfactory, and lifting and peeling are not brought about. Considering the adhesion and the adhesive durability, the above weight average molecular weight is preferably 1,000,000 to 2,200,000, particularly preferably 1,200,000 to 2,000,000. The molecular weight distribution (Mw/Mn) showing a proportion of a weight average molecular weight (Mw) to a number average molecular weight (Mn) is preferably 20 or less. If the molecular weight distribution is 20 or less, the satisfactory adhesive durability is obtained.

The weight average molecular weight and the number average molecular weight described above are values reduced to polystyrene which are measured by gel permeation chromatography (GPC).

In the above pressure-sensitive adhesive material, the (meth)acrylic ester polymer of the component (A) may be used alone or in combination of two or more kinds thereof.

In the pressure-sensitive adhesive material of the present invention, a multifunctional (meth)acrylate base monomer having a molecular weight of less than 1000 can preferably be given as the active energy beam-curable compound used as the component (B).

The above multifunctional (meth)acrylate base monomer having a molecular weight of less than 1000 includes, for example, a difunctional type such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(meth)acryloxyethyl isocyanurate, allylated cyclohexyl di(meth)acrylate, tricyclodecanedimethanol (meth)acrylate, dimethyloldicyclopentane di(meth)acrylate, ethylene oxide-modified hexahydrophthalic acid di(meth)acrylate, neopentyl glycol-modified trimethylpropane di(meth)acrylate, adamantane di(meth)acrylate and 9,9-bis[4-(2-acryloyloxyethoxy)phenyl]fluorene; a trifunctional type such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate and tris(meth)acryloxyethyl isocyanurate; a tetrafunctional type such as diglycerin tetra(meth)acrylate and pentaerythritol tetra(meth)acrylate; a pentafunctional type such as propionic acid-modified dipentaerythritol penta(meth)acrylate; and a hexafunctional type such as dipentaerythritol hexa(meth)acrylate and caprolactone-modified dipentaerythritol hexa(meth)acrylate.

In the present invention, only one kind of the above multifunctional (meth)acrylate base monomers may be used alone or they may be used in combination of two or more kinds thereof. Among them, those having a cyclic structure in a skeleton structure are preferably contained therein. The cyclic structure may be a carbocyclic structure or a heterocyclic structure and may be a monocyclic structure or a polycyclic structure. Suited as the above multifunctional (meth)acrylate base monomer are, for example, those having an isocyanurate structure such as di(meth)acryloxyethyl isocyanurate and tris(meth)acryloxyethyl isocyanurate, dimethyloldicyclopentane di(meth)acrylate, ethylene oxide-modified hexahydrophthalic acid di(meth)acrylate, tricyclodecanedimethanol(meth)acrylate, neopentyl glycol-modified trimethylolpropane di(meth)acrylate and adamantane di(meth)acrylate.

An acrylate base oligomer of an active energy beam-curable type can be used as the component (B). The above acrylate base oligomer has preferably a weight average molecular weight of 50,000 or less. The examples of the above acrylate base oligomer include polyester acrylates, epoxy acrylates, urethane acrylates, polyether acrylates, polybutadiene acrylates and silicone acrylates.

In this respect, the polyester acrylate base oligomers are obtained, for example, by esterifying the hydroxyl groups of a polyester oligomer having hydroxyl groups at both ends which is obtained by condensation of polyvalent carboxylic acid and polyhydric alcohol with (meth)acrylic acid or by esterifying a hydroxyl group at an end of an oligomer obtained by adding alkylene oxide to polyvalent carboxylic acid with (meth)acrylic acid. The epoxy acrylate base oligomers are obtained, for example, by reacting an oxirane ring of a bisphenol A type epoxy resin or a novolak type epoxy resin having a relatively low molecular weight with (meth)acrylic acid and esterifying it. Further, capable of being used as well are epoxy acrylate oligomers of a carboxyl-modified type obtained by modifying partially the above epoxy acrylate base oligomers with dibasic carboxylic anhydride. The urethane acrylate base oligomers are obtained, for example, by esterifying a polyurethane oligomer obtained by reacting polyetherpolyol or polyesterpolyol with polyisocyanate with (meth)acrylic acid, and the polyol acrylate base oligomers are obtained by esterifying a hydroxyl group of polyetherpolyol with (meth)acrylic acid.

A weight average molecular weight of the acrylate base oligomers described above is selected in a range of preferably 50,000 or less, more preferably 500 to 50,000 and further preferably 3,000 to 40,000 in terms of a value reduced to standard polymethyl methacrylate.

The above acrylate base oligomers may be used alone or in combination of two or more kinds thereof.

In the present invention, an adduct acrylate base polymer in which a group having a (meth)acryloyl group is introduced into a side chain can also be used as the component (B). The above adduct acrylate base polymer can be obtained by using a copolymer of (meth)acrylic ester explained in the (meth)acrylic ester polymer of the component (A) with a monomer having a functional group in a molecule to react a part of the functional group of the above copolymer with a compound having a (meth)acryloyl group and a group which reacts with the above functional group. A weight average molecular weight of the above adduct acrylate base polymer is usually 500,000 to 2,000,000 in terms of a value reduced to polystyrene.

In the present invention, one suitably selected from the multifunctional acrylate base monomer, the acrylate base oligomer and the adduct acrylate base polymer each described above may be used as the component (B) or two or more kinds selected from them may be used in combination.

In the present invention, a content ratio of the acrylic polymer of the component (A) to the active energy beam-curable compound of the component (B) falls in a range of preferably 100:1 to 100:100, more preferably 100:5 to 100:50 and further preferably 100:10 to 100:40 in terms of mass ratio from the viewpoint of the performances of the pressure-sensitive adhesive obtained.

A photopolymerization initiator can be added, if necessary, to the pressure-sensitive adhesive material in the present invention. The above photopolymerization initiator includes, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone] and 2,4,6-trimethylbenzoyl-diphenyl-phosphine oxide. They may be used alone or in combination of two or more kinds thereof. A blending amount thereof is selected usually in a range of 0.2 to 20 mass parts per 100 parts of the component (B) described above.

A cross-linking agent can be added, if necessary, as a component (C) to the pressure-sensitive adhesive material in the present invention. The above cross-linking agent shall not specifically be restricted, and optional ones suitably selected from those which have so far conventionally been used as a cross-linking agent in acrylic base pressure-sensitive adhesives can be used. The above cross-linking agent includes, for example, polyisocyanate compounds, epoxy resins, melamine resins, urea resins, dialdehydes, methylol polymers, aziridine base compounds, metal chelate compounds, metal alkoxides and metal salts, and the polyisocyanate compounds are preferably used.

In this respect, capable of being given as the polyisocyanate compounds are aromatic polyisocyanates such as tolylenediisocyanate, diphenylmethanediisocyanate and xylylenediisocyanate, aliphatic polyisocyanates such as hexamethylenediisocyanate, alicyclic polyisocyanates such as isophoronediisocyanate and hydrogenated diphenylmethanediisocyanate, buret bodies and isocyanurate bodies thereof and adduct bodies which are reaction products thereof with low molecular active hydrogen-containing compounds such as ethylene glycol, propylene glycol, neopentyl glycol, trimethylolpropane and castor oil.

In the present invention, the cross-linking agent described above may be used alone or in combination of two or more kinds thereof. A use amount thereof is, though depending on the kind of the cross-linking agent, usually 0.01 to 20 mass parts, preferably 0.1 to 10 mass parts per 100 mass parts of the acrylic base copolymer of the component (A) described above.

A silane coupling agent can be added, if necessary, as a component (D) to the pressure-sensitive adhesive material in the present invention. Addition of the above silane coupling agent improves more an adhesion between the pressure-sensitive adhesive and the glass cell when the polarizing plate is applied, for example, on a liquid crystal glass cell. The above silane coupling agent is suitably an organic silicon compound which has at least one alkoxysilyl group in a molecule and which is well compatible with a pressure-sensitive adhesive component and has a light transmittance, for example, a substantially transparent compound. An addition amount of the above silane coupling agent falls in a range of preferably 0.001 to 10 mass parts, particularly preferably 0.005 to 5 mass parts per 100 mass parts of the pressure-sensitive adhesive material (total amount of the component (A) and the component (B)).

The specific examples of the silane coupling agent described above include polymerizable unsaturated group-containing silicon compounds such as vinyltrimethoxysilane, vinyltriethoxysilane and 3-methacryloxypropyltrimethoxysilane, silicon compounds having an epoxy structure such as 3-glycidoxypropyltrimethoxysilane and 2-(3,4-epoxycyclohexyl)ethyltrimethoxysilane, amino group-containing silicon compounds such as 3-aminopropyltrimethoxysilane, N-(2-aminoethyl)-3-aminopropyltrimethoxysilane and N-(2-aminoethyl)-3-aminopropylmethyldimethoxysilane and 3-chloropropyltrimethoxysilane. They may be used alone or in combination of two or more kinds thereof.

The pressure-sensitive adhesive of the present invention for polarizing plates is prepared by irradiating the foregoing pressure-sensitive adhesive material thus obtained with an active energy beam.

The active energy beam includes, for example, an ultraviolet ray (UV ray) and an electron beam. The UV ray described above is obtained by means of a high pressure mercury lamp, an electrodeless lamp and a xenon lamp. On the other hand, the electron beam is obtained by means of an electron beam accelerator. Among the above active energy beams, a UV ray is particularly suited. When using an electron beam, the pressure-sensitive adhesive can be formed without adding a photopolymerization initiator.

A dose of the active energy beam irradiated onto the above pressure-sensitive adhesive material is suitably selected so that the pressure-sensitive adhesive having a storage elastic modulus and an adhesive strength to non-alkali glass each described above can be obtained. In the case of a UV ray, an illuminance falls preferably in a range of 50 to 1000 mW/cm$^2$, and a light quantity falls preferably in a range of 50 to 1000 mJ/cm$^2$. In the case of an electron beam, it falls preferably in a range of 10 to 1000 krad.

An adhesion improving agent can be added to the pressure-sensitive adhesive material of the present invention in order to enhance an adhesion between the adhesive layer and the polarizing plate. The adhesion improving agent includes aromatic polyisocyanates such as tolylenediisocyanate, diphenylmethanediisocyanate and xylylenediisocyanate and polyisocyanate compounds such as adduct bodies which are reaction products of the aromatic polyisocyanates described above with low molecular active hydrogen-containing compounds such as ethylene glycol, propylene glycol, neopentyl glycol, trimethylolpropane and castor oil. When functional groups are present in the acrylic base polymer in the pressure-sensitive adhesive material, the above polyisocyanate compounds function as the cross-linking agent described above.

The pressure-sensitive adhesive of the present invention has a storage elastic modulus (G') of 0.3 MPa or more at 23° C. If this storage elastic modulus (G') is 0.3 MPa or more, the satisfactory light leakage-preventing property is obtained. An upper limit of the storage elastic modulus (G') at 23° C. shall not specifically be restricted, but it is preferably 50 MPa or less, more preferably 15 MPa or less in order to obtain the pressure-sensitive adhesive having better adhesion durability.

From the viewpoint described above, the storage elastic modulus (G') at 23° C. is particularly preferably 0.35 to 12 MPa, most preferably 0.5 to 5 MPa. Usually, the storage elastic modulus (G') at 80° C. is preferably 0.3 MPa or more, more preferably 0.3 to 10 MPa and particularly preferably 0.3 to 3 MPa.

The storage elastic modulus (G') described above is a value measured by the following method.

<Measuring Method of Storage Elastic Modulus (G')>

The pressure-sensitive adhesive having a thickness of 30 μm is laminated to prepare a cylindrical test piece of 8 mmφ×3 mm thickness, and a storage elastic modulus (G') thereof is measured by a torsional shear method on the following conditions.

Measuring apparatus: dynamic viscoelasticity measuring apparatus "DYNAMIC ANALYZER RDAII" manufactured by Rheometric Corporation Frequency: 1 Hz Temperature: 23° C. and 80° C.

In the pressure-sensitive adhesive of the present invention for polarizing plates, an adhesive strength to non-alkali glass falls preferably in a range of 0.2 to 20 N/25 mm. If this adhesive strength is 0.2 N/25 mm or more, the polarizing plate can be applied on, for example, the liquid crystal glass cell at a satisfactory adhesive strength. On the other hand, if the above adhesive strength is 20 N/25 mm or less, it is possible to remove without damaging the liquid crystal cell. In this case, the adhesive strength is an adhesive strength after 24 hours pass since applied, and hereinafter the adhesive strength after 24 hours pass shall be expressed as an initial value. The adhesive strength described above is a value measured by the following method.

<Adhesive Strength to Non-Alkali Glass>

A sample having a width of 25 mm and a length of 100 mm is cut out from the polarizing plate with a pressure-sensitive adhesive to peel a release sheet therefrom (thickness of an adhesive layer: 25 μm) and apply the polarizing plate on non-alkali glass ("1737" manufactured by Corning Incorporated), and then it is pressurized in an autoclave manufactured by Kurihara Manufactory Inc. on the conditions of 0.5 MPa, 50° C. and 20 minutes. Thereafter, it is left standing for 24 hours under the environment of 23° C. and a relative humidity of 50%, and then the adhesive strength is measured under the above environment by means of a tensile tester (Tensilon manufactured by Orientech Co., Ltd.) on the conditions of a peeling rate of 300 mm/minute and a peeling angle of 180°.

Further, in the pressure-sensitive adhesive of the present invention for polarizing plates, an adhesive strength to non-alkali glass has a rise percentage of preferably 20% or less based on the initial value even after 168 hours pass since applied. If the rise percentage is 20% or less, the satisfactory removability is obtained.

In the pressure-sensitive adhesive of the present invention for polarizing plates, a maximum shearing load at a distortion of 4000% or less in applying the polarizing plate on non-alkali glass at an applying area of 100 mm$^2$ (10 mm×10 mm) and measuring a shearing load at a shearing rate of 0.1 mm/minute is preferably 70 N or less. If the maximum shearing load is 70 N or less, the satisfactory removability is obtained. This maximum shearing load is more preferably 10 to 50 N.

The maximum shearing load described above is a value measured by the following method.

<Measuring Method of Maximum Shearing Load>

A sample having a width of 10 mm and a length of 100 mm is cut out from the polarizing plate with the pressure-sensitive adhesive to peel a release sheet therefrom (thickness of an adhesive layer: 25 μm) and apply the polarizing plate on an end part of non-alkali glass ("1737" manufactured by Corning Incorporated) so that an applying area is 10 mm×10 mm, and then it is pressurized in an autoclave manufactured by Kurihara Manufactory Inc. on the conditions of 0.5 MPa, 50° C. and 20 minutes. Thereafter, it is left standing for 24 hours under the environment of 23° C. and a relative humidity of 50%, and then an end part of a side in which the sample is not applied in non-alkali glass and an end part of a non-applied side in the sample are mounted in a tensile tester (manufactured by Instron Corporation) under the above environment and pulled to a shearing direction at a shearing rate of 0.1 mm/minute to measure a load thereof. Measurement is carried out up to a distortion amount of 4000% (deformation amount in a shearing direction: 1000 μm), and a maximum load up to a deformation of 4000% is set as a maximum shearing load. The distortion is shown by a ratio of a deformation amount in a shearing direction to a thickness of the adhesive layer.

The pressure-sensitive adhesive of the present invention has preferably a gel ratio of 85% or more. That is, when an extent of a low molecular component which is extracted with an organic solvent is small, lifting, peeling and stain to the adherend are small in the environment of heating or high temperature and high humidity, and the pressure-sensitive adhesive having a gel ratio of 85% or more is high in a durability and a stability. The gel ratio is more preferably 90 to 99.9%.

Various additives usually used for acrylic base pressure-sensitive adhesives, for example, tackifiers, antioxidants, UV absorbers, light stabilizers, softening agents, fillers and the like can be added, if necessary, to the pressure-sensitive adhesive of the present invention as long as the object of the present invention is not damaged.

The pressure-sensitive adhesive of the present invention for polarizing plates is applied to a polarizing plate comprising a polarizing film alone, and the above polarizing plate can be used for applying the above polarizing plate to, for example, a liquid crystal glass cell. In particular, the pressure-sensitive adhesive is applied to a polarizing plate in which a polarizing film is integrated with a viewing angle expanding film, and the above polarizing plate can preferably be used for applying the above polarizing plate to, for example, a liquid crystal glass cell.

The foregoing polarizing plate in which a polarizing film is integrated with a viewing angle expanding film includes, for example, a polarizing plate in which a viewing angle expanding function layer comprising a discotic liquid crystal is formed by coating on one face of a polarizing film prepared by sticking a triacetyl cellulose (TAC) film respectively on both faces of a polyvinyl alcohol base polarizer and a polarizing plate on which a viewing angle expanding film is stuck on one face of above-mentioned polarizing film with an adhesive. In this case, the pressure-sensitive adhesive is provided on the side of the viewing angle expanding function layer or the viewing angle expanding film described above.

Figure 2:
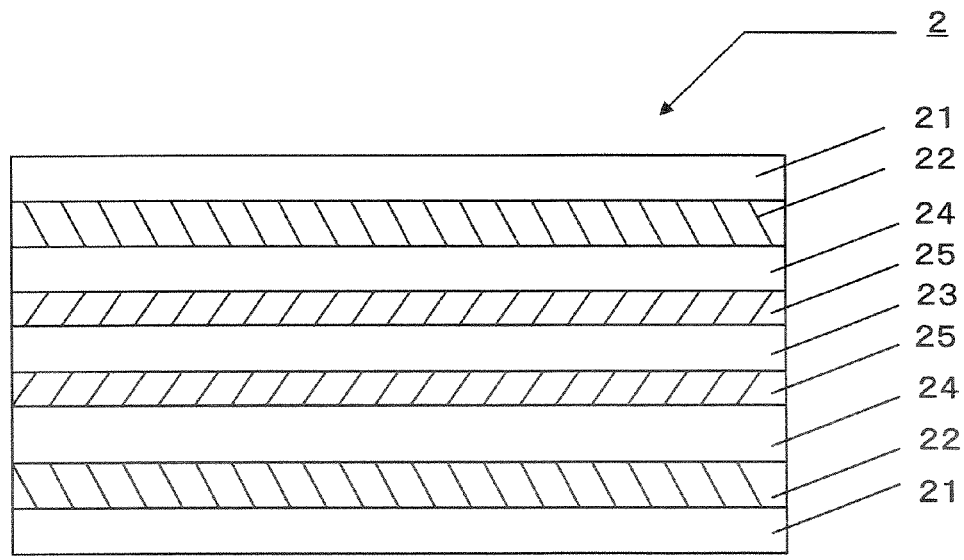
FIG. 2 is an outline drawing showing a constitution of LCD.

Also when a retardation film is present, as shown in FIG. 2, between a polarizing plate and a liquid crystal glass cell, the pressure-sensitive adhesive of the present invention for polarizing plates can suitably be used. That is, a polarizing plate comprising a polarizing film alone is applied on the retardation film with the pressure-sensitive adhesive of the present invention to produce an optical film, and the retardation film of the above optical film is applied on the liquid crystal glass cell with a pressure-sensitive adhesive. In this respect, the pressure-sensitive adhesive used for applying the retardation film on the liquid crystal glass cell shall not specifically be restricted, and a pressure-sensitive adhesive usually used for applying a polarizing plate on a liquid crystal glass cell can be used. To be specific, it includes a pressure-sensitive adhesive composition comprising an acrylic base polymer, a cross-linking agent and a silane compound which is disclosed in Japanese Patent Application Laid-Open No. 131033/1999. The pressure-sensitive adhesive of the present invention can be used as well for applying a polarizing plate on a liquid crystal glass cell.

A liquid crystal display prepared by using the pressure-sensitive adhesive of the present invention for polarizing plates to apply a polarizing plate on a liquid crystal glass cell or a retardation film in the manner described above is less liable to cause light leakage even under the environment of high temperature and high humidity, and in addition thereto, it is excellent in an adhesion durability with the polarizing plate and the liquid crystal glass cell.

Further, the present invention provides a polarizing plate with a pressure-sensitive adhesive having a layer comprising the pressure-sensitive adhesive of the present invention for polarizing plates described above on a polarizing plate. The above polarizing plate may be, as described above, a polarizing plate comprising a polarizing film alone, but in the case of a structure shown in FIG. 1, a polarizing plate in which a polarizing film is integrated with a viewing angle expanding film is preferred.

A thickness of the foregoing layer comprising the pressure-sensitive adhesive for polarizing plates is usually 5 to 100 μm, preferably 10 to 50 μm and more preferably 10 to 30 μm.

A production process for the above polarizing plate with the pressure-sensitive adhesive may be any process as long as it is a process in which a polarizing plate provided thereon with a layer comprising the pressure-sensitive adhesive of the present invention is obtained, and it shall not specifically be restricted. According to the process of the present invention shown below, the desired polarizing plate with the pressure-sensitive adhesive can efficiently be produced.

In the process of the present invention, the polarizing plate is applied on the pressure-sensitive adhesive material layer provided on the release layer of the release sheet, and then the side of the above release sheet is irradiated with an active energy beam so that the pressure-sensitive adhesive material layer is turned into a layer having the prescribed characteristics described above which is constituted from the pressure-sensitive adhesive of the present invention, whereby the polarizing plate with the pressure-sensitive adhesive of the present invention is obtained.

The release sheet described above includes a sheet prepared by coating a releasing agent such as a silicone resin on a plastic film such as a polyester film of polyethylene terephthalate, polybutylene terephthalate, polyethylene naphthalate or the like and a polyolefin film of polypropylene, polyethylene or the like to provide a release layer. A thickness of the above release sheet shall not specifically be restricted and is usually 20 to 150 μm.

The pressure-sensitive adhesive material and the irradiating conditions of the active energy beam have already been explained in the pressure-sensitive adhesive of the present invention for polarizing plates described above.

Capable of being used as a method for providing the pressure-sensitive adhesive material layer on the release sheet is, for example, a method in which a pressure-sensitive adhesive material is coated by means of a bar coating method, a knife coating method, a roll coating method, a blade coating method, a die coating method and a gravure coating method to form a coating film and in which the coating film is dried. The drying conditions shall not specifically be restricted, and it is dried usually at 50 to 150° C. for 10 seconds to 10 minutes.

In the case of a constitution shown in FIG. 1, a polarizing plate comprises a polarizing film alone in many cases, and a layer comprising the pressure-sensitive adhesive for polarizing plates has the same thickness as described above. A production process for the polarizing plate with the pressure-sensitive adhesive in the structure shown in FIG. 1 may be any process as long as it is a process in which a polarizing plate provided thereon with a layer comprising the pressure-sensitive adhesive of the present invention is obtained as is the case with the polarizing plate described above, and it shall not specifically be restricted. The polarizing plate can efficiently be produced by the production process of the present invention described above.

Further, in the case of the constitution shown in FIG. 2, prepared in advance is a pressure-sensitive adhesive sheet in which the pressure-sensitive adhesive for polarizing plates described above is interposed so that it is brought into contact with the release layer sides of two release sheets, and the above pressure-sensitive adhesive sheet can be used to apply the polarizing plate on the retardation film. In this case, when the component (B) described above is used as the pressure-sensitive adhesive, an active energy beam may be irradiated after the pressure-sensitive adhesive is interposed between two release sheets or the pressure-sensitive adhesive is provided on one release sheet, and it is irradiated with the active energy beam and then interposed with the other release sheet. The irradiation conditions of the active energy beam are selected so that obtained is a layer having the prescribed characteristics described above which is constituted from the pressure-sensitive adhesive of the present invention.

When the above pressure-sensitive adhesive sheet is used to produce the optical film of the present invention, the release sheet of the pressure-sensitive adhesive sheet is peeled off, and the pressure-sensitive adhesive sheet is applied on the polarizing plate by an ordinary method.

EXAMPLES

Next, the present invention shall be explained below in further details with reference to examples, but the present invention shall by no means be restricted by these examples.

The performances of the pressure-sensitive adhesives and the polarizing plates with the pressure-sensitive adhesive which were obtained in Examples 1 to 7 and Comparative Examples 1 and 2 were determined by methods shown below.
(1) Storage Elastic Modulus of Pressure-Sensitive Adhesive The storage elastic moduli at 23° C. and 80° C. were measured according to the method described in the present specification.
(2) Adhesive Strength (Adhesive Strength to Non-Alkali Glass)

The adhesive adhesion to non-alkali glass was measured according to the method described in the present specification.
(3) Maximum Shear Load The maximum shear load up to deformation of 4000% was determined according to the method described in the present specification.
(4) Durability of Polarizing Plate with the Pressure-Sensitive Adhesive The polarizing plate with the pressure-sensitive adhesive was controlled to a size of 233 mm×309 mm by means of a cutting apparatus (Super Cutter "PN1-600" manufactured by OGINO SEIKI CO., LTD.) and applied on non-alkali glass ("1737" manufactured by Corning Incorporated), and then it was pressurized in an autoclave manufactured by Kurihara Manufactory Inc. on the conditions of 0.5 MPa, 50° C. and 20 minutes. Thereafter, it was put under the environment of the following respective durability conditions and observed after 200 hours by means of a loupe of 10 magnifications to evaluate the durability according to the following judging criteria.

◯: no defects in 0.6 mm or more from an outer circumferential end part in four sides Δ: defects of less than 0.1 mm in abnormality of appearance of the pressure-sensitive adhesive such as lifting, peeling, foaming and stripes in 0.6 mm or more from an outer circumferential end part in any one side of four sides X: defects of 0.1 mm or more in abnormality of appearance of the pressure-sensitive adhesive such as lifting, peeling, foaming and stripes in 0.6 mm or more from an outer circumferential end part in any one side of four sides <Durability Conditions>

Environment of 60° C. and relative humidity of 90%, dry environment of 80° C., dry environment of 90° C.

Heat shock test of −20° C. 60° C. for each 30 minutes, 200 cycles
(5) Light Leakage Performance The polarizing plates with the pressure-sensitive adhesive was controlled to a size of 233 mm×309 mm by means of a cutting apparatus (Super Cutter "PN1-600" manufactured by Ogino Seiki Co., Ltd.) and applied on non-alkali glass ("1737" manufactured by Corning Incorporated), and then it was pressurized in an autoclave manufactured by Kurihara Manufactory Inc. on the conditions of 0.5 MPa, 50° C. and 20 minutes. The polarizing plates with the pressure-sensitive adhesives were applied on front and back sides of the non-alkali glass so that a polarizing axis assumed a cross nicol state. It was left standing in this state at 80° C. for 200 hours. Then, it was left standing for 2 hours under the environment of 23° C. and a relative humidity of 50% to evaluate a light leakage property under the above environment by a method shown below.

Figure 3:
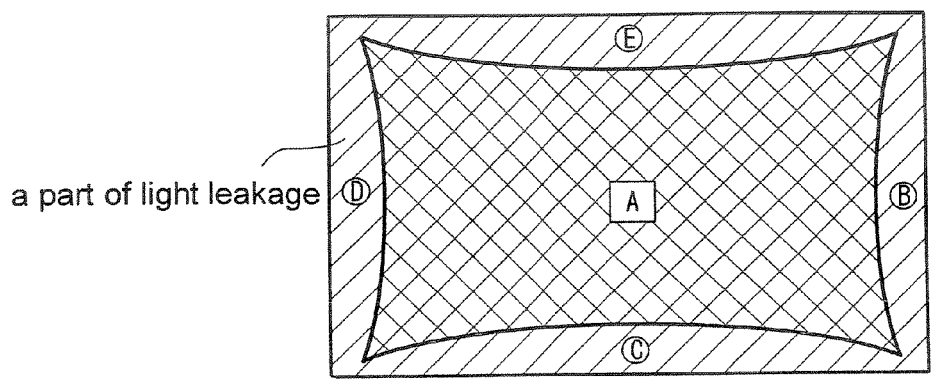
FIG. 3 is an explanatory drawing showing a method for evaluating a light leaking property of the polarizing plates provided with the pressure-sensitive adhesive obtained in the examples and the comparative examples.

MCPD-2000 manufactured by OTSUKA ELECTRONICS CO., LTD. was used to measure brightnesses in the respective areas shown in FIG. 3, and a brightness difference ΔL* was determined by an equation:

$$\Delta L^* = [(b+c+d+e)/4] - a$$

(wherein a, b, c, d and e each are brightnesses at measuring points (one point in the central part of each area) settled in advance respectively in an A area, a B area, a C area, a D area and a E area), and it shows a light leakage property. It is shown that the smaller the value of ΔL* is, the smaller the light leakage is, and usually, if it is less than 4.0, the polarizing plate can be used for a liquid crystal display.
(6) Gel Ratio The pressure-sensitive adhesive having a thickness of 25 μm was sampled in a size of 80 mm×80 mm and wrapped in a polyester-made mesh (mesh size: 200) to weigh precisely only the weight of the pressure-sensitive adhesive by means of a precision balance. The weight thereof is set as M1. A Soxhlet extractor was used to dip the pressure-sensitive adhesive in an ethyl acetate solvent, and the solvent was refluxed to carry out treatment for 16 hours. Then, the pressure-sensitive adhesive was taken out and dried in air under the environment of a temperature of 23° C. and relative humidity of 50% for 24 hours, and it was further dried in an oven of 80° C. for 12 hours. The weight of the pressure-sensitive adhesive alone after dried was weighed by means of a precision balance. The weight thereof is set as M2. The gel ratio (%) is represented by (M2/M1)×100.

Examples 1 to 7 and Comparative Examples 1 and 2

A pressure-sensitive adhesive material (a) having a composition (reduced to a solid content) shown in Table 1 was prepared, and toluene was added thereto as a solvent to obtain a coating solution controlled to a solid content of 20 mass %. The above coating solution was coated on a release layer of a polyethylene terephthalate-made release film having a thickness of 38 μm ("SP-PET3811" manufactured by LINTEC Corporation) as a release sheet by means of a knife coater so that the thickness after dried was 25 μm, and then it was subject to drying treatment at 90° C. for one minute to form a pressure-sensitive adhesive material layer.

Then, a polarizing plate comprising a polarizing film provided with a discotic crystal liquid layer was applied on the pressure-sensitive adhesive material layer so that the pressure-sensitive adhesive material layer was brought into contact with the discotic crystal liquid layer. After 30 minutes passed since applied, a release film side was irradiated with a UV ray on the following conditions to produce a polarizing plate with the pressure-sensitive adhesive. The pressure-sensitive adhesive layer had a thickness of 25 μm.

<UV Irradiating Conditions>
Electrodeless lamp using an H valve, manufactured by Fusion Co., Ltd.

Illuminance: 600 mW/cm$^2$, light quantity: 150 mJ/cm$^2$

"UVPF-36" manufactured by EYEGRAPHICS Co., Ltd. was used for a UV illuminance and light quantity meter.

The evaluation results of the performances of the pressure-sensitive adhesives and the polarizing plates with the pressure-sensitive adhesive are shown in Table 2.

TABLE 1

Composition of pressure-sensitive adhesive material (a)

| | Acrylic base polymer (A) | | | Multifunctional acrylic base monomer (B) | | Photo-polymerization initiator[7] (mass part) | Polyisocyanate compound (C)[8] (mass part) | Silane coupling agent (D)[9] (mass part) |
|---|---|---|---|---|---|---|---|---|
| | Kind | Weight average molecular weight (Mw) | Molecular weight distribution (Mw/Mn) | Amount (mass part) | Kind | Amount (mass part) | | | |
| Example 1 | BA[1] | 1.8 million | 4.06 | 100 | M-315[5] | 15 | 1.5 | 4 | 0.1 |
| Example 2 | BA | 1.8 million | 4.06 | 100 | M-315 | 15 | 1.5 | 8 | 0.1 |
| Example 3 | BA | 1.8 million | 4.06 | 100 | M-315 | 20 | 1.5 | 4 | 0.1 |
| Example 4 | BA | 1.8 million | 4.06 | 100 | R-684[6] | 24 | 1.5 | 4 | 0.1 |
| Example 5 | BA | 1.8 million | 4.06 | 100 | M-315 | 15 | 1.5 | 0 | 0.1 |
| Example 6 | BA/AA[2] (99.8/0.2) | 1.8 million | 4.22 | 100 | M-315 | 15 | 1.5 | 4 | 0.1 |
| Example 7 | BA/AA[3] (99.5/0.5) | 1.8 million | 4.44 | 100 | M-315 | 15 | 1.5 | 4 | 0.1 |
| Comparative Example 1 | BA | 1.8 million | 4.06 | 100 | — | 0 | — | 0 | 0.1 |
| Comparative Example 2 | BA/AA[4] (99/1) | 1.8 million | 4.50 | 100 | M-315 | 15 | 1.5 | 4 | 0.1 |

Remarks:
1) BA: polymer of butyl acrylate
2) BA/AA: copolymer of butyl acrylate and acrylic acid (mass ratio 99.8/0.2)
3) BA/AA: copolymer of butyl acrylate and acrylic acid (mass ratio 99.5/0.5)
4) BA/AA: copolymer of butyl acrylate and acrylic acid (mass ratio 99/1)
5) M-315: tris(acryloxyethyl) isocyanurate, molecular weight=423, trifunctional type (trade name: Aronix M-315, manufactured by Toagosei Co., Ltd.)
6) R-684: tricyclodecanedimethanol acrylate ("KAYARAD R-684", molecular weight=336, manufactured by Nippon Kayaku Co., Ltd.)
7) Photopolymerization initiator: mixture of benzophenone and 1-hydroxycyclohexyl phenyl ketone in a mass ratio of 1:1, "Irgacure 500", manufactured by Ciba Specialty Chemicals Co., Ltd.
8) Polyisocyanate compound (cross-linking agent, adhesion improving agent): trimethylol-modified tolylenediisocyanate ("Coronate" L, manufactured by NIPPON POLYURETHANE INDUSTRY CO., LTD.)
9) Silane coupling agent: 3-glycidoxypropyltrtimethoxysilane ("KBM-403", manufactured by Shin-Etsu Chemical Co., Ltd.)

the active energy beam-curable compound is a multifunctional (meth)acrylate base monomer having a cyclic structure, and a photopolymerization initiator, with an active energy beam and wherein the pressure-sensitive adhesive has a storage elastic modulus (G') of 0.3 MPa or more at 23° C., wherein the ratio (A)/(B) is in a range from 100:10 to 100:50 by mass ratio, and (A) is a polymer consisting of units from at least one monomer selected from the group consisting of methyl(meth)acrylate, ethyl(meth)acrylate, propyl(meth)acrylate, butyl(meth)acrylate, pentyl(meth)acrylate, hexyl (meth)acrylate, cyclohexyl(meth)acrylate, 2-ethylhexyl (meth)acrylate, isooctyl(meth)acrylate, decyl(meth)acrylate, dodecyl(meth)acrylate, myristyl(meth)acrylate, palmityl (meth)acrylate, stearyl(meth)acrylate, 2-hydroxyethyl(meth) acrylate, 2-hydroxypropyl(meth)acrylate, 3-hydroxypropyl (meth)acrylate, 2-hydroxybutyl(meth)acrylate, 3-hydroxybutyl(meth)acrylate and 4-hydroxybutyl(meth) acrylate, acrylamide, methacrylamide, N-methylacrylamide, N-methylmethacrylamide, N-methylolacrylamide and N-methylolmethacrylamide, monomethylaminoethyl(meth) acrylate, monoethylaminoethyl(meth)acrylate, monomethylaminopropyl(meth)acrylate and monoethylaminopropyl (meth)acrylate, and optionally one or more monomers selected from the group consisting of (meth)acrylic acid, crotonic acid, maleic acid, and itaconic acid.

TABLE 2

| | Performances of pressure-sensitive adhesive | | | | | | Performances of polarizing plate provided with pressure-sensitive adhesive | | | | |
|---|---|---|---|---|---|---|---|---|---|---|---|
| | Storage elastic modulus (MPa) | Adhesive strength (N/25 mm) | | | Gel ratio (%) | Maximum shear load (N) | Durability | | | | Light leakage performance [ΔL*] |
| | | 24 hr | | Rise | | | 60° C. | 80° C. | 90° C. | | |
| | 23° C. 80° C. | (initial value) | 168 hr | rate (%) | | | 90% RH | dry | dry | Heat shock | |
| Example 1 | 0.94 0.43 | 15 | 16 | 6.7 | 96 | 23 | ○ | ○ | ○ | ○ | 0.56 |
| Example 2 | 2.34 1.07 | 5 | 5 | 0 | 95 | 21 | ○ | ○ | ○ | ○ | 0.52 |
| Example 3 | 1.41 0.63 | 6 | 7 | 16.7 | 94 | 30 | ○ | ○ | ○ | ○ | 0.36 |
| Example 4 | 0.95 0.41 | 10 | 10 | 0 | 91 | 34 | ○ | ○ | ○ | ○ | 0.48 |
| Example 5 | 1.2 0.71 | 3.5 | 4 | 14.3 | 98 | 20 | ○ | Δ | ○ | Δ | 1.49 |
| Example 6 | 1.31 0.66 | 5 | 5.5 | 10.0 | 97 | 32 | ○ | ○ | ○ | Δ | 0.78 |
| Example 7 | 1.31 0.66 | 16 | 18.9 | 18.0 | 96 | 36 | Δ | ○ | Δ | Δ | 0.78 |
| Comparative Example 1 | 0.11 0.09 | 7 | 7 | 0 | 2 | 8 | X | X | X | X | 0.39 |
| Comparative Example 2 | 0.87 0.73 | 21.5 | 42 | 95.3 | 96 | 58 | ○ | ○ | ○ | ○ | 0.88 |

INDUSTRIAL APPLICABILITY

The pressure-sensitive adhesive of the present invention for polarizing plates is suitably applied to a polarizing plate, particularly a polarizing plate integrated with a viewing angle expanding film or a polarizing plate comprising a retardation film laminated thereon and can apply the above polarizing plate on a liquid crystal cell with good adhesion, and it has the characteristic that a liquid crystal display obtained therefrom is less liable to cause light leakage even under the environment of high temperature and high humidity. When an applying position is deviated, the polarizing plate can be peeled off again even after some time passes since applied, and the expensive liquid crystal cell can be reused.

What is claimed is:

1. A pressure-sensitive adhesive for polarizing plates, which is prepared by irradiating a pressure-sensitive adhesive material comprising (A) an acrylic base polymer comprising a structural unit obtained from a monomer having a carboxyl group in a monomer composition ratio of 0.5 mass % or less and (B) an active energy beam-curable compound, wherein the active energy beam-curable compound is a multifunctional (meth)acrylate base monomer having a cyclic structure, and a photopolymerization initiator, with an active energy beam and wherein the pressure-sensitive adhesive has a storage elastic modulus (G') of 0.3 MPa or more at 23° C., wherein the ratio (A)/(B) is in a range from 100:10 to 100:50 by mass ratio, and (A) is a polymer consisting of units from at least one monomer selected from the group consisting of methyl(meth)acrylate, ...

2. The pressure-sensitive adhesive for polarizing plates as described in claim 1, wherein the storage elastic modulus (G') at 23° C. is 0.3 to 15 MPa.

3. The pressure-sensitive adhesive for polarizing plates as described in claim 1 or 2, wherein the storage elastic modulus (G') at 80° C. is 0.3 MPa or more.

4. The pressure-sensitive adhesive for polarizing plates as described in claim 3, wherein the storage elastic modulus (G') at 80° C. is 0.3 to 10 MPa.

5. The pressure-sensitive adhesive for polarizing plates as described in claim 1, wherein it is used for applying a polarizing plate on a liquid crystal glass cell.

6. The pressure-sensitive adhesive for polarizing plates as described in claim 1, wherein the multifunctional (meth)acrylate base monomer having a cyclic structure has a molecular weight of less than 1000.

7. The pressure-sensitive adhesive for polarizing plates as described in claim 1, wherein the pressure-sensitive adhesive material further comprises (C) a cross-linking agent.

8. The pressure-sensitive adhesive for polarizing plates as described in claim 1, wherein the pressure-sensitive adhesive material further comprises (D) a silane coupling agent.

9. The pressure-sensitive adhesive for polarizing plates as described in claim 1, wherein an adhesive strength to non-alkali glass is 0.2 to 20 N/25 mm.

10. The pressure-sensitive adhesive for polarizing plates as described in claim 9, wherein a rise percentage of the adhesive strength to non-alkali glass after 168 hours pass since applied is 20% or less based on the initial value.

11. The pressure-sensitive adhesive for polarizing plates as described in claim 1, wherein a maximum shear load at a distortion of 4000% or less in applying the polarizing plate on non-alkali glass at an applying area of 100 mm$^2$ (10 mm×10 mm) and measuring a shear load at a shearing rate of 0.1 mm/minute is 70 N or less.

12. The pressure-sensitive adhesive for polarizing plates as described in claim 1, wherein a gel ratio is 85% or more.

13. A polarizing plate with a pressure-sensitive adhesive, characterized by having a layer comprising the pressure-sensitive adhesive as described in claim 1 on a polarizing plate.

14. A production process for the polarizing plate with the pressure-sensitive adhesive as described in claim 13, comprising applying a polarizing plate on a pressure-sensitive adhesive material layer provided on a release layer of a release sheet and then irradiating a release sheet side with an active energy beam.

15. A pressure-sensitive adhesive sheet prepared by interposing the pressure-sensitive adhesive for polarizing plates as described in claim 1 between two release sheets so that the pressure-sensitive adhesive is brought into contact with release layer sides of the release sheets.

* * * * *